(12) United States Patent
Gantt, II

(10) Patent No.: US 11,220,219 B2
(45) Date of Patent: Jan. 11, 2022

(54) TRUCK STEP ADDITION APPARATUS

(71) Applicant: James H Gantt, II, Knoxville, TN (US)

(72) Inventor: James H Gantt, II, Knoxville, TN (US)

( * ) Notice: Subject to any disclaimer, the term of this patent is extended or adjusted under 35 U.S.C. 154(b) by 139 days.

(21) Appl. No.: 16/823,867

(22) Filed: Mar. 19, 2020

(65) Prior Publication Data

US 2021/0291742 A1    Sep. 23, 2021

(51) Int. Cl.
*B60R 3/00* (2006.01)

(52) U.S. Cl.
CPC .................................... *B60R 3/00* (2013.01)

(58) Field of Classification Search
CPC ............................................................ B60R 3/00
See application file for complete search history.

(56) References Cited

U.S. PATENT DOCUMENTS

| 4,836,568 | A | 6/1989 | Preslik |
| 5,265,896 | A | 11/1993 | Kravitz |
| 6,340,191 | B1 | 1/2002 | Brady |
| D494,117 | S | 8/2004 | Ruffin |
| 6,971,657 | B2 | 12/2005 | King |
| 8,720,924 | B2 | 5/2014 | Ruehl |
| 9,156,405 | B1 * | 10/2015 | Levesque ................. B60R 3/00 |
| 10,457,217 | B1 * | 10/2019 | Lingerfelt ............... E05B 85/00 |
| 2005/0117969 | A1 * | 6/2005 | Byrne .................... E04F 11/112 404/19 |
| 2009/0322052 | A1 * | 12/2009 | Ruehl ....................... B60R 3/00 280/166 |
| 2018/0099615 | A1 * | 4/2018 | Goodier ................. B60K 11/02 |
| 2018/0126912 | A1 * | 5/2018 | Tanaka .................... B60R 3/00 |
| 2021/0291742 | A1 * | 9/2021 | Gantt, II .................. B60R 3/00 |

* cited by examiner

Primary Examiner — Bryan A Evans

(57) ABSTRACT

A truck step addition apparatus for easier entry into a tall truck includes a lower block having a plurality of lower mounting apertures extending from a lower top side through a lower bottom side. A plurality of first mounting hardware sets secures the lower block to a truck step of a truck. An upper block is coupled to the lower block and has a plurality of upper mounting apertures extending from an upper top side through an upper bottom side. A grip plate is coupled to the upper block and has a pair of plate mounting apertures extending from a textured plate top side through a plate bottom side. A plurality of second mounting hardware sets secures the grip plate to the upper block, the upper block to the lower block, and the lower block to the truck step of the truck.

8 Claims, 5 Drawing Sheets

TRUCK STEP ADDITION APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to truck accessory devices and more particularly pertains to a new truck accessory device for easier entry into a tall truck.

(2) Description of Related Art Including Information Disclosed Under 37 CFR 1.97 and 1.98

The prior art relates to truck accessory devices. Existing devices serve as replacement truck steps or standalone truck steps rather than as add-ons to existing truck steps. Such devices thus fail to offer additional step heights to serve as intermediate steps for the user.

BRIEF SUMMARY OF THE INVENTION

An embodiment of the disclosure meets the needs presented above by generally comprising a lower block having a lower front side, a lower back side, a lower left side, a lower right side, a lower top side, and a lower bottom side. The lower block has a plurality of lower mounting apertures extending from the lower top side through the lower bottom side. A plurality of first mounting hardware sets is selectively engageable through the plurality of lower mounting apertures and is configured to secure the lower block to a truck step of a truck. An upper block is coupled to the lower block. The upper block has an upper front side, an upper back side, an upper left side, an upper right side, an upper top side, and an upper bottom side. The upper block has a plurality of upper mounting apertures extending from the upper top side through the upper bottom side. A grip plate is coupled to the upper block. The grip plate has a textured plate top side, a plate bottom side, and a plate edge, the plate edge conforming to the upper top side. The grip plate has a pair of plate mounting apertures extending from the plate top side through the plate bottom side. A plurality of second mounting hardware sets is selectively engageable through the plurality of plate mounting aperture, the plurality of upper mounting apertures, and the plurality of lower mounting apertures and is configured to secure the grip plate to the upper block, the upper block to the lower block, and the lower block to the truck step of the truck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
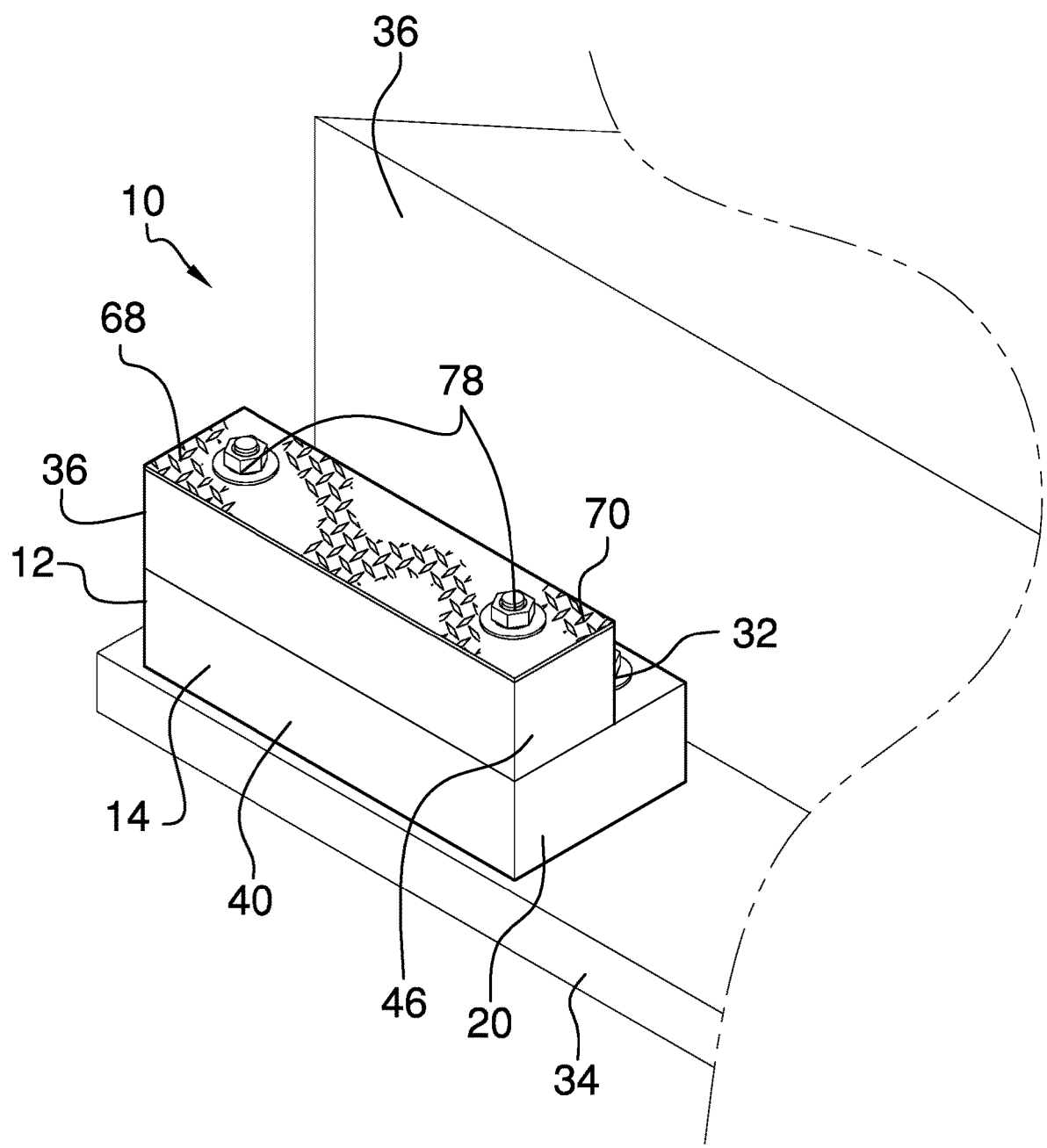
FIG. 1 is an in-use view of a truck step addition apparatus according to an embodiment of the disclosure.
Figure 2:
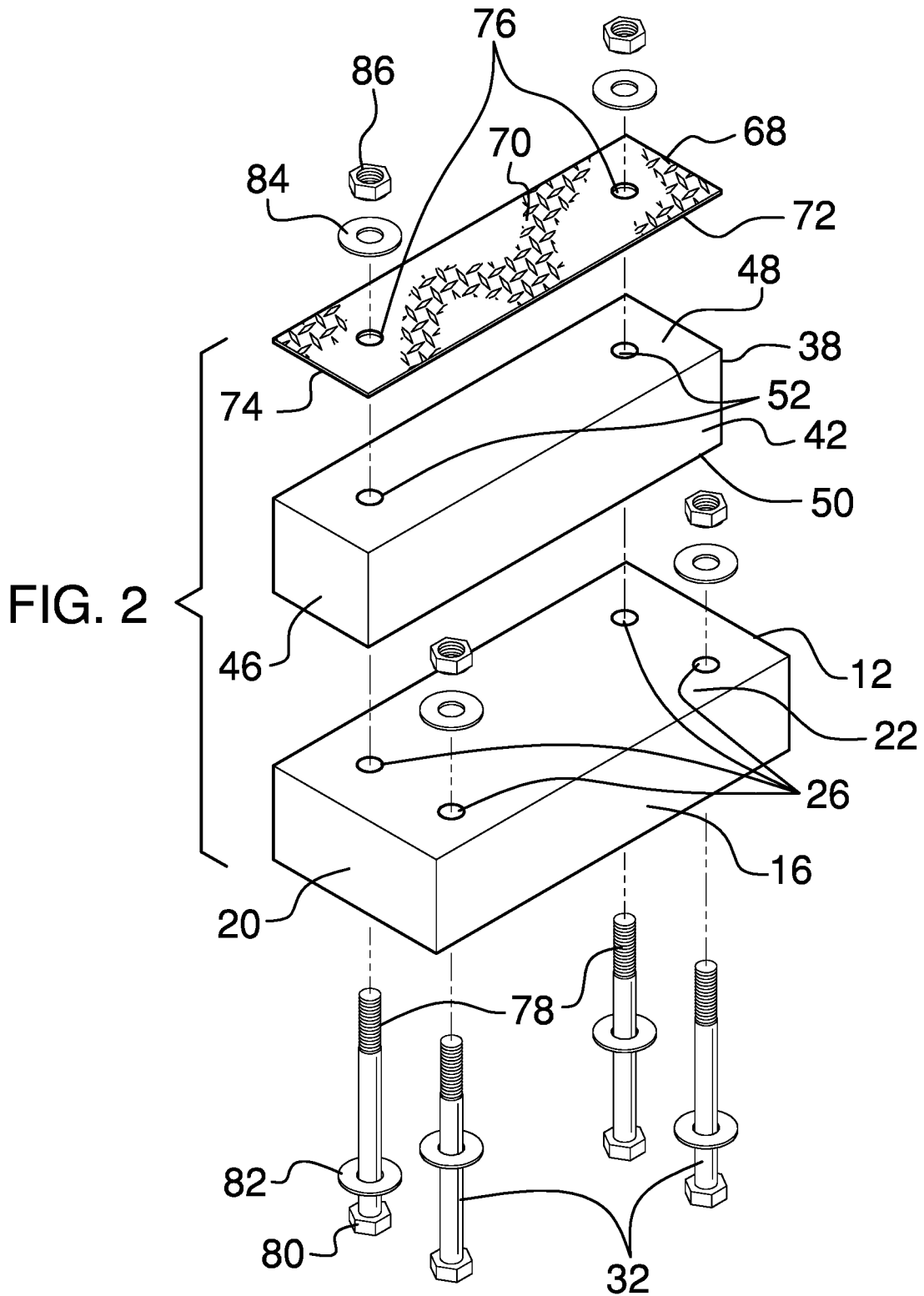
FIG. 2 is an isometric exploded view of an embodiment of the disclosure.
Figure 3:
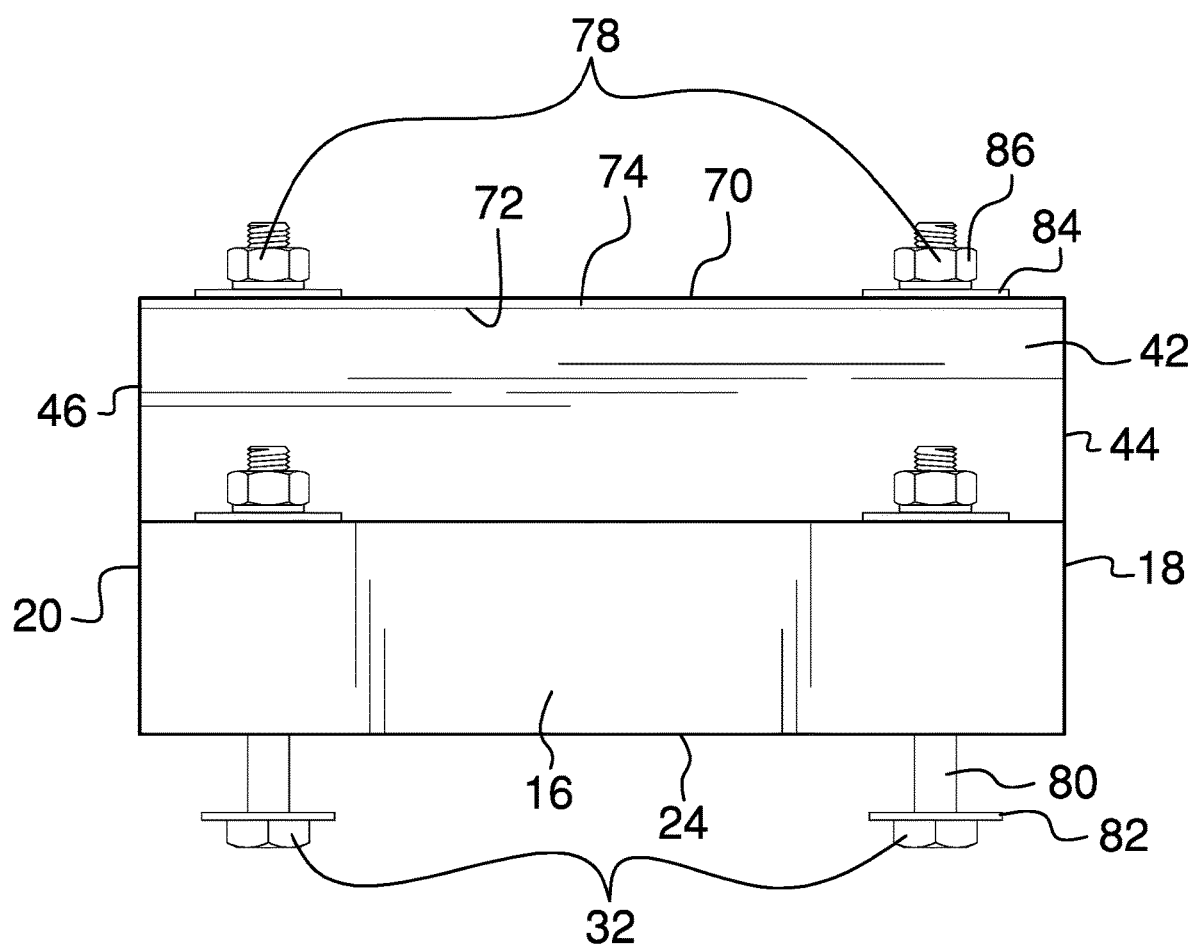
FIG. 3 is a front elevation view of an embodiment of the disclosure.
Figure 4:
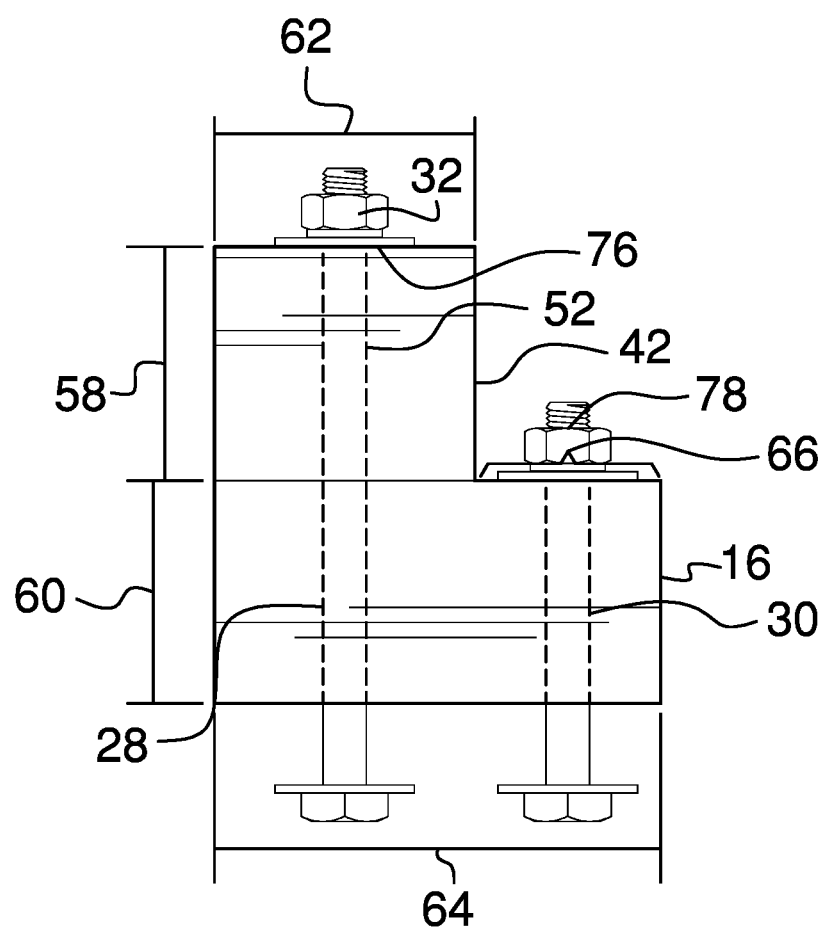
FIG. 4 is a side elevation view of an embodiment of the disclosure.
Figure 5:
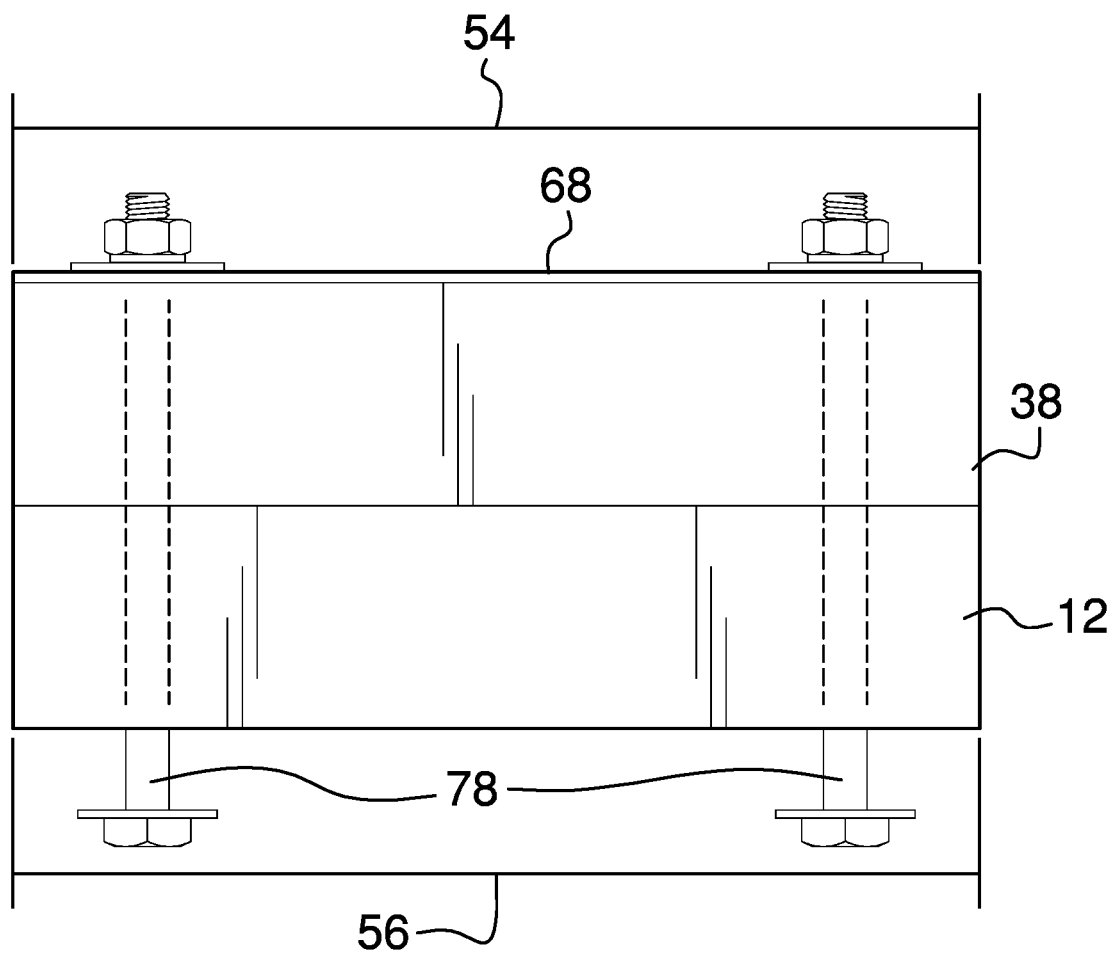
FIG. 5 is a rear elevation view of an embodiment of the disclosure.

With reference now to the drawings, and in particular to FIGS. 1 through 5 thereof, a new truck accessory device embodying the principles and concepts of an embodiment of the disclosure and generally designated by the reference numeral 10 will be described.

As best illustrated in FIGS. 1 through 5, the truck step addition apparatus 10 generally comprises a lower block 12 having a lower front side 14, a lower back side 16, a lower left side 18, a lower right side 20, a lower top side 22, and a lower bottom side 24. The lower block 12 has a plurality of lower mounting apertures 26 extending from the lower top side 22 through the lower bottom side 24. The plurality of lower mounting apertures 26 may comprise a set of front lower mounting apertures 28 and a set of back lower mounting apertures 30. A plurality of first mounting hardware sets 32 is selectively engageable through the set of back lower mounting apertures 30 and is configured to secure the lower block 12 to a truck step 34 of a truck 36.

An upper block 38 is coupled to the lower block 12. The upper block 38 has an upper front side 40, an upper back side 42, an upper left side 44, an upper right side 46, an upper top side 48, and an upper bottom side 50. The upper block 38 has a plurality of upper mounting apertures 52 extending from the upper top side 48 through the upper bottom side 50. The plurality of upper mounting apertures 52 aligns with the set of front lower mounting apertures 28. Each of the upper block 38 and the lower block 12 are durable, weatherproof material and may be dent resistant yet non-deformable.

An upper length 54 of the upper block between the upper left side 44 and the upper right side 46 may be equal to a lower length 56 of the lower block between the lower left side 18 and the lower right side 20. An upper height 58 of the upper block between the upper bottom side 50 and the upper top side 48 may be equal to a lower height 60 of the lower block between the lower bottom side 24 and the lower top side 22. An upper width 62 of the upper block between the upper front side 40 and the upper back side 42 being equal to 50%-60% of a lower width 64 of the lower block between the lower front side 14 and the lower back side 16. The lower top side 22 thus has an exposed portion 66 when the upper block 38 is coupled to the lower block 12 to accommodate the plurality of first mounting hardware sets 32. The upper height 58 may be equal to the upper width 62.

A grip plate 68 is coupled to the upper block 38. The grip plate 68 has a textured plate top side 70, a plate bottom side 72, and a plate edge 74. The plate edge 74 may conform to the upper top side 48 such that the whole upper top side 48 is covered. The plate top side 70 may be diamond plate for improved grip and durability. The grip plate 68 has a pair of plate mounting apertures 76 extending from the plate top side 70 through the plate bottom side 72.

A plurality of second mounting hardware sets 78 is selectively engageable through the plurality of plate mounting apertures 76, the plurality of upper mounting apertures 52, and the set of front lower mounting apertures 28. The plurality of second mounting hardware sets 78 is configured to secure the grip plate 68 to the upper block 38, the upper block 38 to the lower block 12, and the lower block 12 to the truck step 34 of the truck. Each of the plurality of first mounting hardware sets 32 and each of the plurality of second mounting hardware sets 78 may comprise a bolt 80, a lower washer 82, an upper washer 84, and a nut 86. Each of the plurality of first mounting hardware sets 32 and each of the plurality of second mounting hardware sets 78 may thus be easily disengaged to remove the apparatus 10 from the truck 36 as desired.

In use, each of the plurality of first mounting hardware sets 32 and each of the plurality of second mounting hardware sets 78 is mounted through the plurality of plate mounting apertures 76, the plurality of upper mounting apertures 52, and the plurality of lower mounting apertures 26 to the truck step 34. The apparatus 10 is then stepped on to more easily enter and exit the truck 36 as an intermediate step after the truck step 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck step addition apparatus comprising:
   a lower block having a lower front side, a lower back side, a lower left side, a lower right side, a lower top side, and a lower bottom side, the lower block having a plurality of lower mounting apertures extending from the lower top side through the lower bottom side;
   a plurality of first mounting hardware sets being selectively engageable through the plurality of lower mounting apertures and configured to secure the lower block to a truck step of a truck;
   an upper block coupled to the lower block, the upper block having an upper front side, an upper back side, an upper left side, an upper right side, an upper top side, and an upper bottom side, the upper block having a plurality of upper mounting apertures extending from the upper top side through the upper bottom side;
   a grip plate coupled to the upper block, the grip plate having a textured plate top side, a plate bottom side, and a plate edge, the plate edge conforming to the upper top side, the grip plate having a pair of plate mounting apertures extending from the plate top side through the plate bottom side; and
   a plurality of second mounting hardware sets being selectively engageable through the plurality of plate mounting apertures, the plurality of upper mounting apertures, and the plurality of lower mounting apertures and being configured to secure the grip plate to the upper block, the upper block to the lower block, and the lower block to the truck step of the truck.

2. The truck step addition apparatus of claim 1 further comprising the plurality of lower mounting apertures comprising a set of front lower mounting apertures and a set of back lower mounting apertures; the plurality of first mounting hardware being selectively engageable through the set of back lower mounting apertures; and the plurality of upper mounting apertures aligning with the set of front lower mounting apertures.

3. The truck step addition apparatus of claim 1 further comprising an upper length of the upper block between the upper left side and the upper right side being equal to a lower length of the lower block between the lower left side and the lower right side.

4. The truck step addition apparatus of claim 1 further comprising an upper height of the upper block between the upper bottom side and the upper top side being equal to a lower height of the lower block between the lower bottom side and the lower top side.

5. The truck step addition apparatus of claim 4 further comprising an upper width of the upper block between the upper front side and the upper back side being equal to 50%-60% of a lower width of the lower block between the lower front side and the lower back side.

6. The truck step addition apparatus of claim 5 further comprising the upper height being equal to the upper width.

7. The truck step addition apparatus of claim 1 further comprising each of the plurality of first mounting hardware sets and each of the plurality of second mounting hardware sets comprising a bolt, a lower washer, an upper washer, and a nut.

8. A truck step addition apparatus comprising:
- a lower block having a lower front side, a lower back side, a lower left side, a lower right side, a lower top side, and a lower bottom side, the lower block having a plurality of lower mounting apertures extending from the lower top side through the lower bottom side, the plurality of lower mounting apertures comprising a set of front lower mounting apertures and a set of back lower mounting apertures;
- a plurality of first mounting hardware sets being selectively engageable through the set of back lower mounting apertures and configured to secure the lower block to a truck step of a truck;
- an upper block coupled to the lower block, the upper block having an upper front side, an upper back side, an upper left side, an upper right side, an upper top side, and an upper bottom side, the upper block having a plurality of upper mounting apertures extending from the upper top side through the upper bottom side, the plurality of upper mounting apertures aligning with the set of front lower mounting apertures, an upper length of the upper block between the upper left side and the upper right side being equal to a lower length of the lower block between the lower left side and the lower right side, an upper height of the upper block between the upper bottom side and the upper top side being equal to a lower height of the lower block between the lower bottom side and the lower top side, an upper width of the upper block between the upper front side and the upper back side being equal to 50%-60% of a lower width of the lower block between the lower front side and the lower back side, the upper height being equal to the upper width;
- a grip plate coupled to the upper block, the grip plate having a textured plate top side, a plate bottom side, and a plate edge, the plate edge conforming to the upper top side, the grip plate having a pair of plate mounting apertures extending from the plate top side through the plate bottom side; and
- a plurality of second mounting hardware sets being selectively engageable through the plurality of plate mounting apertures, the plurality of upper mounting apertures, and the plurality of lower mounting apertures and being configured to secure the grip plate to the upper block, the upper block to the lower block, and the lower block to the truck step of the truck, each of the plurality of first mounting hardware sets and each of the plurality of second mounting hardware sets comprising a bolt, a lower washer, an upper washer, and a nut.

\* \* \* \* \*